(12) United States Patent
Koenhen

(10) Patent No.: US 6,454,943 B1
(45) Date of Patent: Sep. 24, 2002

(54) LONGITUDINAL REINFORCED SELF-SUPPORTING CAPILLARY MEMBRANES AND THEIR USE

(75) Inventor: Dirk Marinus Koenhen, Dedemsvaart (NL)

(73) Assignee: S. Search B.V., Hoogeveen (NL)

( * ) Notice: Subject to any disclaimer, the term of this patent is extended or adjusted under 35 U.S.C. 154(b) by 0 days.

(21) Appl. No.: 09/432,246

(22) Filed: Nov. 2, 1999

(30) Foreign Application Priority Data

Nov. 3, 1998 (NL) .............................................. 1010458

(51) Int. Cl.$^7$ ........................ B01D 63/00; B01D 67/00; B01D 71/06
(52) U.S. Cl. ............. 210/500.21; 210/490; 210/500.23; 210/505; 264/45.9
(58) Field of Search .................... 210/490, 500.36, 210/500.38, 500.23, 503, 505, 508, 321.87, 321.88, 321.89, 500.21, 491; 96/4, 7–10; 264/41, 45.1, 49, 45.9; 40/497.01

(56) References Cited

U.S. PATENT DOCUMENTS

| 3,494,121 | A | | 2/1970 | Bohrer |
| 4,061,821 | A | | 12/1977 | Hayano et al. |
| 4,900,443 | A | * | 2/1990 | Wrasidlo ..................... 210/490 |
| 5,472,607 | A | | 12/1995 | Mailvaganam et al. ..... 210/490 |
| 5,599,380 | A | * | 2/1997 | Koros .............................. 96/4 |
| 5,679,248 | A | * | 10/1997 | Blaney |
| 5,820,659 | A | * | 10/1998 | Ekiner et al. ..................... 96/8 |
| 6,169,045 | B1 | * | 1/2001 | Pike et al. |
| 6,264,045 | B1 | * | 7/2001 | Wilson et al. ......... 210/500.23 |

FOREIGN PATENT DOCUMENTS

| EP | 0 761 292 A | 3/1997 |
| EP | 0 819 467 A | 1/1998 |
| FR | 2 616 812 A | 12/1988 |
| GB | 1 374 704 A | 11/1974 |
| JP | 53 028084 A | 3/1978 |

* cited by examiner

Primary Examiner—Joseph W. Drodge
(74) Attorney, Agent, or Firm—Thomas, Kayden, Horstemeyer & Risley

(57) ABSTRACT

The invention relates to self-supporting capillary membranes which are longitudinally reinforced by continuous reinforcing fibres incorporated in the wall of the capillary membrane, which fibres extend in the longitudinal direction of the capillary membrane. The capillary membranes according to the invention have an improved ultimate tensile strength and a reduced elongation at break as a result of which capillary rupture caused by flow transverse to the capillary membranes occurs considerably fewer times.

15 Claims, 2 Drawing Sheets

LONGITUDINAL REINFORCED SELF-SUPPORTING CAPILLARY MEMBRANES AND THEIR USE

REFERENCE TO FOREIGN PRIORITY APPLICATION/PATENT

This application claims the benefit the copending Netherlands Patent Application entitled "Longitudinal Reinforced Self-Supporting Capillary Membranes and Their Use" filed on Nov. 3, 1998, and accorded serial number 1010458, which is entirely incorporated herein by reference.

FIELD OF THE INVENTION

The present invention relates to self-supporting capillary membranes, to the manufacture of such membranes and to the use of these membranes in separation, filtration and purifying techniques.

BACKGROUND OF THE INVENTION

Micro, ultra, nano or reversed osmosis membranes are increasingly used in the filtration of suspended particles and solids and in the separation of solutes and liquids, of liquids and liquids and of gases and liquids.

A much used shape of these membranes is a flat shape in which the membrane is laid on a support of for instance polyester. Usually the actual separation membrane is a thin layer of polymer which is made porous, which in itself has insufficient strength to resist the pressures applied. In general such a membrane is only suitable for methods in which the pressure is exerted from the side of the separation layer on the membrane supported by the support. A pressure exerted from the other side mostly would cause the membrane layer to detach from the substrate.

Another shape of a membrane is the tubular or capillary shape. Also in this shape a reinforcement is used to obtain the required strength. An early example of this is given by W. W. Cooper et al in U.S. Pat. No. 3,676,193. The membrane is applied here on a tubular porous knitted support. Cooper et all describe both the arrangement on the outer surface of the support and the arrangement on the inner surface of the support. When the membrane is situated on the outer surface it will be suitable for filtration from the inner surface to the outer surface and when the membrane is situated on the inner surface it will be suitable for filtration from inside to the outside. Besides knitted materials also non-wovens are suitable as supporting layer.

The aforementioned supporting layer also serves to prevent the membrane layer from shrinking during the formation of the membrane, particularly during the formation according to the coagulation process, as a result of which the pore structure formed is disturbed. In U.S. Pat. No. 4,061,821 Hayano describes the prevention of this effect and also the reinforcement of the membrane formed by the reinforcing material. In U.S. Pat. No. 5,472,607 Mail-vaganum describes a comparable supported membrane for filtration from the outer surface.

Without reinforcement the tubular or capillary membranes would not be able to resist the working pressure applied. The reinforcement therefore serves to sufficiently increase the bursting pressure or the collapsing pressure, that is to say the pressure at which the membrane bursts or breaks, depending on the direction of filtration. Usually the reinforcement therefore is a knit or a non-woven in which fibres in various directions are present, but none or very few fibres in the longitudinal direction are present.

When the diameter of the membrane is smaller than approximately 8 mm, it will be possible to manufacture self-supporting capillaries without reinforcing materials which are able to resist the desired working pressures. Such membranes are usually also able to resist the desired pressure from both sides and can therefore be back flushed. A first example of such a membrane is described by Stein et al (J. Api. Polymer Science 20, 2377–2391 (1976) and U.S. Pat. No. 4,051,300). Back flushing is also described by Klein and Schneider (Desalination 41, 263–275 (1982)) and more recently by Wenten et al in U.S. Pat. No. 5,560,828. At the moment several membranes which are able to resist pressures from both sides and therefore can be back flushed, are commercially available.

In practice the filtration is carried out in a module which contains a number of capillaries. A shape often used for a filtration element is a shape in which the capillaries are situated parallel in a tubular housing and in which the capillaries are embedded in a "potting material" on both sides. Such an element in which the permeate is discharged at the tube ends, is described by Mahon et al in U.S. Pat. No. 3,228,877 and 3,228,876. In U.S. Pat. No. 4,997,564 Herczeg et al describe a type of filtration element in which the permeate is discharged through a central tube.

Although the capillary membranes in themselves have sufficient pressure resistance, problems like capillary rupture regularly occur to the filtration elements described above. Said capillary rupture is the result of the fact that whereas the capillaries are fixated at their ends in the potting material, between those ends they have a certain degree of freedom of movement. Because of the supply and discharge of liquid, forces transverse to the capillary may arise in the filtration elements which give rise to bending forces and tensile forces on the point of the transition of embedding to free membrane. In practice most of the capillary ruptures are therefore found on this point. The bending forces are the result of too large an elongation with a certain lateral load. Non-reinforced capillary membranes made of thermoplastic polymers already have an elongation of some percent at a relatively low load. A bending and a tensile force therefore arise with a lateral force. As these are absorbed by the potting and it is also known that the weakest point of the membrane is situated there (Klein, J. Appl. Pol. Sci 20, 2377–2394 (1976)) the rupture will start at that location. Without elongation lateral movement would be impossible. This effect particularly plays a part in the use of so-called laterally streamed or transversal streamed elements such as described in i.a. H. Futselaar, Thesis Technical University Twente (1993) because the flow here by definition is transverse to the capillaries. NL 1004489 describes a filtration membrane element in which the occurrence of transverse forces on capillary membranes is counteracted by installing one or more distribution tubes each having at least one opening to the membrane compartment, transverse with respect to the capillary membranes. Such a solution can of course not be used in transversely streamed elements.

T. C. Bohrer describes in U.S. Pat. No. 3,494,121 a hollow reinforced composite fibre produced by contacting a plurality of monofilaments e.g. from 2 to 500 or more, preferably from about 25 to 75 monofilaments with a solution comprised of a polymer and an organic solvent to form a unitary filamentary structure and heating said structure to remove the solvent and form a hollow fibre.

In GB 1 374 704 a tubular membrane is disclosed having a wall permeable to liquids and a tubular reinforcing means which is embedded in the membrane material and consists of threads crossing each other, the threads extending in two substantially mutual perpendicular directions, one of the directions being generally axial. As only example of the tubular reinforcing means a tubular, woven fabric is given.

SUMMARY OF THE INVENTION

It is an object of the invention to solve the problem of capillary rupture by providing capillary membranes with an increased tensile strength and reduced elongation in longitudinal direction, in which the flow through the membrane is not affected by the presence of the reinforcing fibre or fibres and which are easy to produce.

It was found that by incorporating reinforcing fibres in the wall material of the capillary membrane the ultimate tensile strength of the membrane can be increased without affecting the functioning of the membrane.

DETAILED DESCRIPTION OF THE INVENTION

Figure 1:
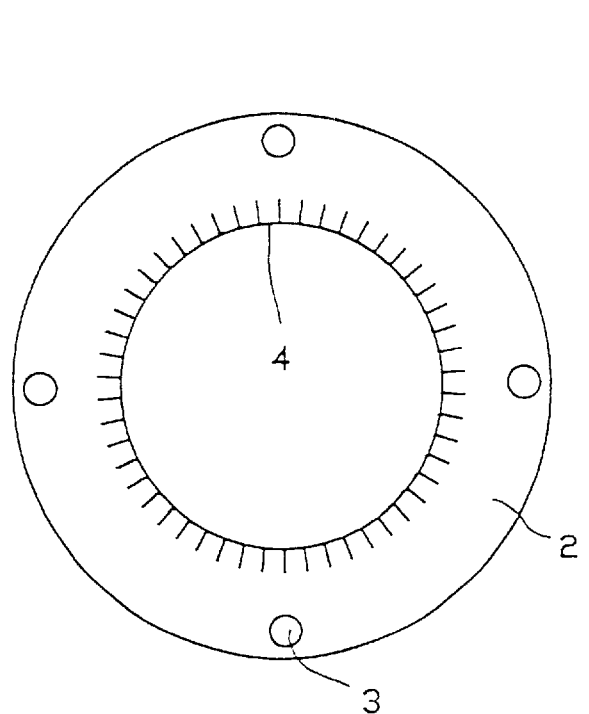
FIGS. 1 and 2 are schematic cross-sections of examples of reinforced capillary membranes.

In one aspect the invention provides a self-supporting capillary membrane, which is longitudinally reinforced with one or more continuous reinforcing fibres incorporated in the wall material of the capillary membrane, which fibres extend in the longitudinal direction of the capillary membrane, said membrane being obtained by extruding the hollow fibre in a known manner using an extruder and guiding the reinforcing fibres through the spinneret of the extruder so that the reinforcing fibres are coextruded with the membrane in the longitudinal direction and are incorporated in the wall of the capillary membrane.

In another aspect the invention provides a self-supporting membrane obtained by a process comprising forming by means of an extruder a sheet of a semi-permeable material with channels extending in the direction of extrusion and running parallel to the sheet surface, and guiding reinforcing fibres through the spinneret of the extruder so that the reinforcing fibres are coextruded with the membrane in the longitudinal direction and are incorporated into the wall of the membrane.

In a further aspect the invention relates to a process for preparing a self-supporting membrane which is longitudinally reinforced with one ore more continuous reinforcing fibres which are incorporated in the wall material of the membrane, which process comprises providing a solution of a polymer, extruding said solution through the spinneret of an extruder which spinneret includes one or more lumen needles and has a spinning orifice, supplying a liquid or gas through the one or more needles during the extrusion of the polymer solution to produce a lumen in the extruded material, and guiding one or more reinforcing fibres through the spinneret and through the spinning orifice, and removing the solvent from the extruded material, to form a self-supporting membrane having one ore more channels extending in the direction of the extrusion and running parellel to the membrane surface and having one or more reinforcing fibres incorporated in the membrane material and extending in the direction of extrusion.

In another aspect the invention relates to use of the present membrane in the filtration of suspended solids and particles, and separation of solutes and liquids, of liquids and of liquids and gases.

The capillary membranes according to the invention have a considerably improved ultimate tensile strength and strongly reduced elongation at break with regard to the usual capillary membranes according to the state of the art, whereas good burst and collapsing pressures are maintained. As in general the diameter of the reinforcing fibre is small with respect to the wall thickness and only a limited number of fibres is needed for obtaining the required ultimate tensile strength, the porosity of the membrane and thus the flux through the membrane are not or hardly hampered.

Another advantage of the longitudinally reinforced capillary membranes according to the invention is that because of the reduced elongation it is prevented that in usual filtration elements the separate capillaries contact each other. If capillaries contact each other the outward pressure is no longer to all sides as a result of which point concentrated load occurs. Capillaries badly withstand point concentrated load so that damage occurs earlier. With the longitudinally reinforced self-supporting capillary membranes according to the invention point concentrated load is prevented.

Lateral displacement of capillary membranes can also occur in those cases in which the capillary material swells as a result of certain liquids in the medium to be filtered. In the longitudinally reinforced self-supporting capillary membranes according to the invention the reinforcing fibres prevent that the material expands in longitudinal direction as a result of swelling and consequently the capillary membrane displaces itself in lateral direction.

The reinforcing fibre can be arranged both at the outer surface of the cross-section of the capillary membrane and at the inner surface of the membrane. The reinforcing fibre can also be arranged in the middle of the membrane material. The pore size of a capillary membrane generally is not homogeneous over the cross-section of the membrane. By arranging fibres in the portion of the capillary membrane where the pore size is largest, little additional hydrodynamic resistance will occur as a result of introducing the reinforcing fibres and the danger of leakage will be small as well. The separating layer, or filtration layer, is preferably provided at the side opposite the side near which the reinforcing fibre is situated. When the reinforcing fibre is located in the middle of the membrane a separating layer can be provided on both sides.

Figure 2:
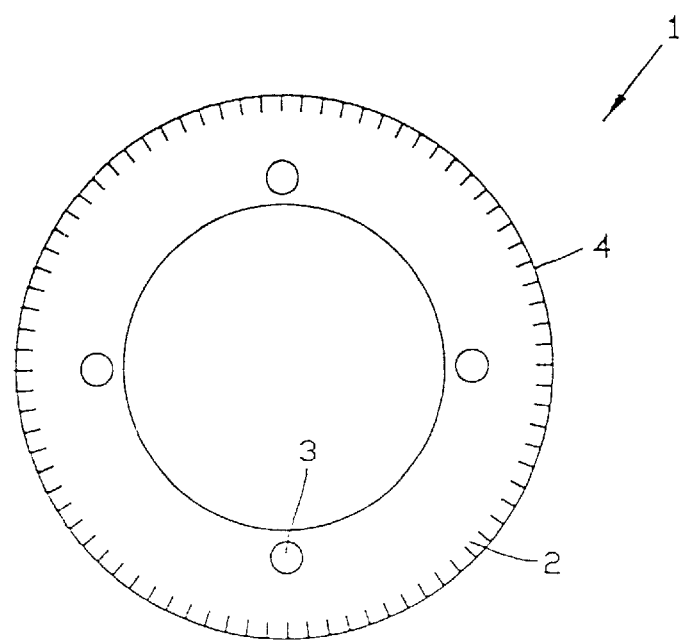

FIG. 1 and FIG. 2 schematically show the cross-section of two examples of reinforced capillary membranes (1) according to the invention, in which the reinforcing fibres (3) are arranged at the inner surface and the outer surface, respectively, of the capillary wall (2) and the separating layer (4) is provided near the opposite side of the capillary wall.

The outer diameter of the self-supporting capillary membrane according to the invention generally is from 0.3 to 8 mm and particularly from 0.7 to 5 mm. The inner diameter generally is from 0.2 to 6 mm and particularly from 0.4 to 3 mm. The wall thickness is generally from 0.1 to 2 mm and particularly from 0.2 to 1 mm. The thickness of the reinforcing fibre is from 0.01 to 0.5 mm. The distance between the reinforcing fibre and the separating layer has to be at least 0.1 mm.

Although it is possible to obtain a self-supporting capillary membrane of sufficient strength using only one fibre, it is generally preferred to use at least 4 fibres. The number if reinforcing fibres preferably is no more than 16 because otherwise there is the danger that the flux through the membrane is hampered too much.

The reinforcing fibre used in the invention can be a mono filament, but it can also be a twined multi filament fibre.

The reinforcing fibre has an ultimate tensile strength of at least 4 g/dtex and preferably more than 15 g/dtex. The elongation at break of the reinforcing fibre is 15% at the most and preferably smaller than 5%. Suitable reinforcing fibres for use according to the invention include polyester fibres, poly aramid fibres (for instance Kevlar® by Dupont, Twaron® by Akzo-Nobel), polypropylene fibres (for instance Dyneema® by DSM), polyacryl fibres etc. Optionally it may be advantageous to pretreat the fibres to ensure adhesion to the membrane material. For Dyneema® fibres for instance a corona treatment is suitable. Mechanical anchoring in the membrane matrix by provideding roughness or irregularities on the reinforcing fibre may also have an advantageous effect. For example, said roughness can be obtained by using twined multi filament fibres.

The membrane material preferably is a polymer. Suitable polymers are known to the expert. Examples are polysulphone type polymers, cellulose acetate, polyacrylonitrile, polypropylene, polyvinylidene fluoride. Polysuphones are preferred.

The reinforced self-supporting capillary membranes according to the invention can be manufactured by co-extruding the reinforcing fibres in the longitudinal direction when extruding the capillaries in the usual manner.

A usual method to manufacture capillary membranes includes dissolving a suitable polymer in a solvent, optionally adding additives and extruding through a spinneret for a capillary membrane and coagulating it afterwards and removing dissolvable components (this technique is called wet spinning).

Figure 3:
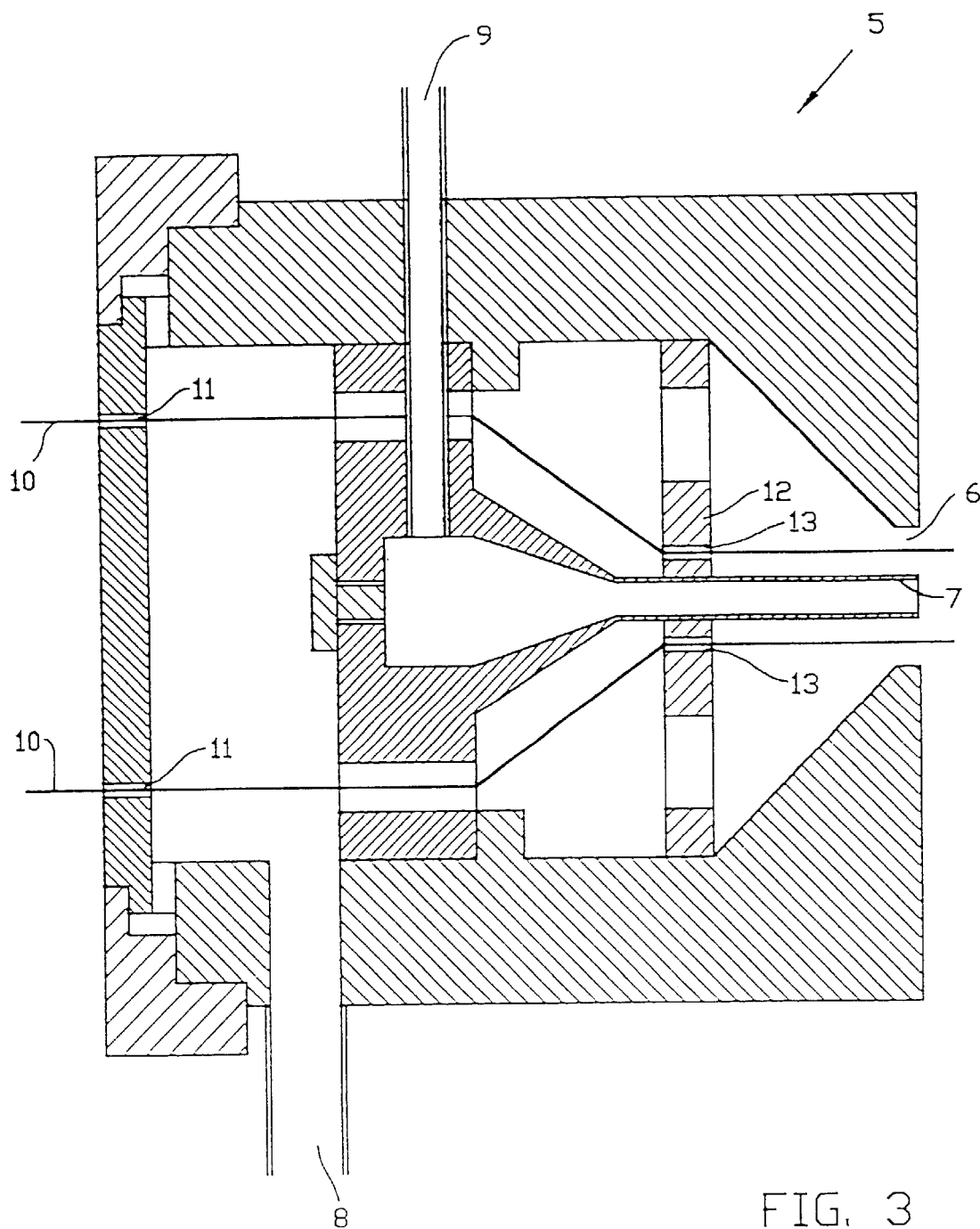
FIG. 3 is a longitudinal cross-section of a spinneret used to manufacture the membranes.

FIG. 3 schematically shows the cross-section in longitudinal direction of a spinneret (5) which can be used for manufacturing the reinforced capillary membranes according to the invention. The polymer solution is supplied via supply (8) and extruded through spinning orifice (6). During the extrusion of the membrane, a liquid or a gas which is supplied via supply (9), can be injected in the extruded material through lumen needle (7) as a result of which a lumen is formed. The reinforcing fibre (10) is pulled through the spinning orifice (6) through appropriately sized openings (11) in the rear wall of the spinneret and through appropriately sized openings (13) in the fibre guide (12), for instance a disc arranged on the lumen needle (7).

By varying the conditions, for instance the composition of the liquid to be injected, during extrusion, it is possible to provide the separating layer as desired on the outer surface of the membrane or at the inner surface, at the side of the lumen. As a result asymmetric pores are obtained.

This method is also suitable for introducing reinforcing in capillaries which are formed by other means, such as the TIPS technique (Thermal induced phase separation), with which often symmetrical membranes are obtained. The only requirement is that in an extrusion the reinforcing fibres can be spun along.

It is also possible to co-extrude the reinforcing fibres when extruding the membranes in sheet form with channels such as described in Dutch patent application 1009866.

The self-supporting capillary membranes according to the invention are suitable for both filtration from the inside to the outside and filtration from the outside to the inside depending on the location of the separating layer. In both cases back flushing is possible.

The self-supporting capillary membranes according to the invention are also suitable for further processing (for instance by applying an additional separating layer using known techniques (coating, interfacial polymerisation)). As a result membranes can be made suitable for membrane separation techniques such as pervaporation, gas separation, dialysis, pertraction, etc.

The self-supporting capillary membranes according to the invention can be used in devices for filtering suspended solids and particles and separation of fluids. Besides in usual tubular filtration elements the self-supporting capillary membranes can very well be used in membrane contactors such as the one described in U.S. Pat. Nos. 5,104,535 and 5,230,796.

The invention will now be illustrated by examples and comparative examples.

EXAMPLES

Comparative Example 1

Using a solution of polyether sulphone consisting of 20% polyether sulphone, 8% polyvinyl pyrrolidone, 9% glycerol and 63% N-methyl pyrrolidone a fibre was spun having an internal diameter of 1.5 mm and an external diameter of 2.5 mm. The filtration layer was provided at the inner surface by injecting water/N-methyl pyrrolidone in a ratio of 80/20. Coagulation took place in a water bath of 65° C., after an air track of 10 cm. The extrusion speed was 5 m/min. After the removal of the dissolvable components the fibre had a permeation rate for water at 25° C. of 950 l/m$^2$/h/bar. The cut-off value was approximately 100,000 D. The ultimate tensile strength was 4 kg at which an elongation of 20% occurred. At a tensile force of 0.5 kg the elongation was 2%.

Example 1

Using a solution of the same composition as in comparative example 1 a fibre was spun having the same dimensions and furthermore using the same conditions. At the outer surface of the membrane on each quadrant a Dyneema fibre of approximately 0.1 mm (SK 65, 440 dtex, twined, produced by DSM) which had undergone a corona treatment, was arranged. The permeation rate and the retention appeared to be the same as those of the membrane in example 1. The ultimate tensile strength now was 45 kg at which an elongation of only 3% occurred.

Comparative Example 2

Using the polymer solution of comparative example 1 a capillary membrane having an internal diameter of 3 mm and an external diameter of 5 mm was spun. The filtration layer was produced at the inner surface by injecting water/N-methyl pyrrolidone in a ratio of 50/50. Coagulation took place in a water bath of 65° C., after an air track of 10 cm. The extrusion speed was 5 m/min. After the removal of the dissolvable components the fibre had a permeation rate for water at 25° C. of 12,000 l/m$^2$/h/bar. The pore size of the membrane was 0.2 mm. The pores at the outer surface of the membrane were 1 μm.

The ultimate tensile strength of the membrane was 18 kg, at which an elongation of 25% occurred. At a tensile force of 2 kg the elongation was already 3%.

Example 2

A same capillary membrane as in comparative example 2 was spun, but now with four polypropylene fibres in the middle of the wall. The fibre was Twaron® type 2200, 1680 dte (Akzo-Nobel). The ultimate tensile strength of the capillary membrane now was 140 kg at an elongation of only 2.8%. At a tensile force of 2 kg the elongation was 0.03%.

Example 3

A same capillary membrane as in example 2 was spun, but now with polyester yarn of 400 dtex. The ultimate tensile strength of the capillary membrane was now 51 kg with an elongation of 15%. At a tensile force of 2 kg the elongation was 0.5%.

What is claimed is:

1. A self-supporting membrane of a porous polymer, which membrane is produced by providing a solution of a polymer in a solvent, extruding the solution of a polymer through a spinneret provided with plural lumen needles, supplying a liquid or gas through the lumen needles in the extruded solution of a polymer, removing the solvent and optionally the liquid supplied through the lumen needles so as to form a membrane having the form of a sheet of semi-permeable material having an outer surface and inner surfaces and comprising channels extending in the direction of the extrusion and running parallel to the outer surface, wherein the membrane is longitudinally reinforced with reinforcing fibers, which are guided through the spinneret and coextruded with the solution of the polymer so that the reinforcing fibers are incorporated in the membrane.

2. The membrane according to claim 1, wherein the reinforcing fibers are arranged at the outer surface of the membrane and a separating layer is provided at an inner surface of the membrane.

3. The membrane according to claim 1, wherein the reinforcing fibers are arranged at the inner surfaces of the membrane and a separating layer is provided at the outer surface of the membrane.

4. The membrane according to claim 1, wherein the reinforcing fibers are arranged in the middle of the membrane and a separating layer is provided at the inner surfaces of the membrane and/or the outer surface of the membrane.

5. The membrane according to claim 1, wherein the reinforcing fibers are aramid fibers having a tensile strength of more than 15 g/dtex.

6. The membrane according to claim 1, wherein the reinforcing fibers are polypropylene fibers having a tensile strength of more than 25 g/dtex.

7. A process for preparing a reinforced membrane comprising providing a solution of a polymer in a solvent, extruding the solution of a polymer through a spinning orifice of a spinneret provided with one or more lumen needles, supplying a liquid or gas through the one or more lumen needles in the extruded solution of a polymer during the extrusion of the solution of the polymer, removing the solvent so as to form a membrane having one or more channels extending in the direction of the extrusion and running parallel to the membrane surface wherein during the extrusion of the solution of the polymer one or more reinforcing fibers are guided through the spinneret and coextruded with the solution of the polymer so that the reinforcing fibers are incorporated into the membrane.

8. A self-supporting capillary membrane having a wall of a porous polymer, which capillary membrane is produced by providing a solution of a polymer in a solvent, extruding this solution of a polymer through a spinning orifice of a spinneret provided with a lumen needle, supplying a liquid or gas through the lumen needle into the extruded polymer solutions, removing the solvent and optionally the liquid or gas supplied through the lumen needle so as to form a hollow capillary membrane having an outer surface and an inner surface, wherein the capillary membrane is longitudinally reinforced with one or more reinforcing fibers which a guided through the spinning orifice and coextruded with the solution of the polymer so that the one or more reinforcing fibers are incorporated into the wall of the capillary membrane.

9. The membrane according to claim 8, wherein the number of reinforcing fibers is in the range of 1–16.

10. The membrane according to claim 8, wherein the number of reinforcing fibers is 1–4.

11. The membrane according to claim 8, wherein the reinforcing fibers are arranged at the outer surface of the membrane and a separating layer is provided at the inner surface of the membrane.

12. The membrane according to claim 8, wherein the reinforcing fibers are arranged at the inner surface of the membrane and a separating layer is provided at the outer surface of the membrane.

13. The membrane according to claim 8, wherein the reinforcing fibers are arranged in the middle of the membrane and a separating layer is provided at the inner surface of the membrane and/or the outer surface of the membrane.

14. The membrane according to claim 8, wherein the reinforcing fibers are aramid fibers having a tensile strength of more than 15 g/dtex.

15. The membrane according to claim 8, wherein the reinforcing fibers are polypropylene fibers having a tensile strength of more than 25 g/dtex.

* * * * *